United States Patent [19]

Yello

[11] 3,748,581

[45] July 24, 1973

[54] MULTI-MODE DETECTOR CIRCUIT

[75] Inventor: Joseph F. Yello, Wood Dale, Ill.

[73] Assignee: Zenith Radio orporation, Chicago, Ill.

[22] Filed: Dec. 13, 1971

[21] Appl. No.: 207,207

[52] U.S. Cl. .................... 325/317, 325/316, 329/1, 329/147

[51] Int. Cl. .................... H04b 1/06

[58] Field of Search ...... 325/315–317; 329/1, 2, 147

[56] References Cited

UNITED STATES PATENTS

| | | | |
|---|---|---|---|
| 2,354,959 | 8/1944 | McCoy | 325/317 |
| 3,201,695 | 8/1965 | Mason et al. | 325/317 |
| 2,937,274 | 5/1960 | Horowitz | 329/2 |

*Primary Examiner*—Albert J. Mayer
*Attorney*—John J. Pederson and John H. Coult

[57] ABSTRACT

A multi-band wave-signal receiver incorporates a novel detector circuit for demodulating AM, FM and NBFM signals at two widely divergent IF frequencies. The detector employs a novel split-winding resonant input circuit which allows FM signals at 10.7 MHz and NBFM signals at 455 kHz to be alternately demodulated by a single ratio detector without bandswitching the input circuit. Provision is made for disconnecting the ratio detector filter capacitor to permit detection of 455 kHz AM signals, and for generating appropriate AGC signals in all three operating modes.

9 Claims, 1 Drawing Figure

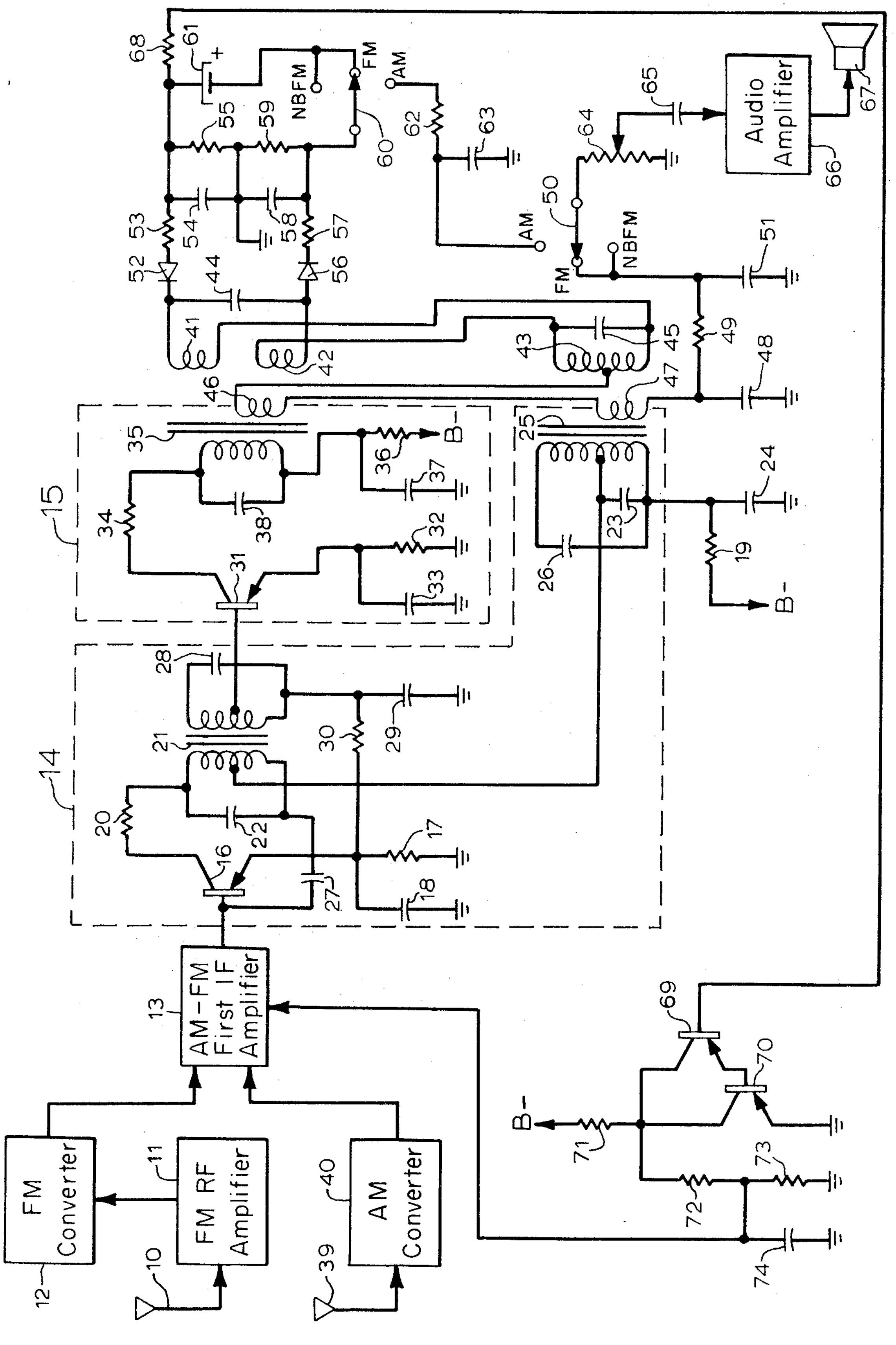
FM Converter
FM RF Amplifier
AM Converter
AM-FM First IF Amplifier
Audio Amplifier
NBFM
FM
AM
B-

MULTI-MODE DETECTOR CIRCUIT

BACKGROUND OF THE INVENTION

This invention relates in general to multi-band radio receivers, and more particularly to an improved multi-mode detector circuit for use therein. The invention is especially but not exclusively applicable to the detector stage of a superheterodyne radio receiver capable of selectively receiving either amplitude-modulated (AM) carrier waves lying in the AM broadcast band, frequency-modulated (FM) carrier waves lying in the FM broadcast band, or narrow-band frequency-modulated (NBFM) carrier waves lying in the public service or police bands.

Under established U.S. standards governing radio broadcasts there exist two broadcast bands, an AM low-frequency band extending from 550 kHz to 1,600 kHz, and an FM high-frequency band extending from 88 MHz to 108 MHz. In designing consumer-type superheterodyne radio receivers for receiving these widely divergent frequency bands, it has become almost universal practice to utilize different intermediate frequencies for the two operating modes, a low frequency in the order of 455 kHz for AM reception and a higher frequency in the order of 10.7 MHz for FM reception. This is necessary because of certain practical design considerations associated with providing adequate selectivity and image rejection under the diverse IF bandwidth requirements of the two signals; 280 kHz bandwidth being required for the ±75 kHz standard deviation FM signals and 12 kHz bandwidth being required to accommodate the 50–10,000 hertz modulated AM signals.

In recent years interest has developed in adapting such AM-FM receiver designs to receive other bands such as the public service and police bands, which under present U.S. standards occupy a frequency range of 145 MHz–175 MHz. Standards for transmissions in these bands require narrow-band frequency-modulated transmissions typically having a maximum deviation of ±5 kHz. It will be appreciated that such NBFM signals cannot be successfully translated by the 10.7 MHz FM IF amplifier because of its excessive 280 kHz bandwidth. Fortunately, the 12 kHz bandwidth of the 455 kHz AM IF amplifier has proven suitable for this purpose, obviating the need for adding an additional IF amplifier channel to the receiver. Unfortunately, however, prior-art AM-FM detectors capable of demodulating both the standard 10.7 MHz FM and the 455 kHz AM intermediate-frequency signals have not been capable of demodulating the 455 kHz NBFM signal without complex and expensive ganged switching arrangements totally impractical for compact solid-state portable receivers. Heretofore the only solution has been to provide a completely separate NBFM detector for such receivers, unnecessarily adding to their cost and complexity.

Accordingly, it is an object of the present invention to provide a new and improved detector for a multi-band radio receiver.

It is a more specific object of the present invention to provide a detector for demodulating FM signals at two different alternate IF frequencies.

It is a still more specific object of the present invention to provide an economical detector for demodulating AM, FM and NBFM signals without the need for complex mode-switching circuitry.

It is still another specific object of the present invention to provide a new and improved detector for selectively demodulating FM signals at a first IF frequency and AM and NBFM signals at a second IF frequency widely-divergent from the first IF frequency.

The invention is directed to a detector circuit for a wave-signal receiver of the type having an intermediate-frequency amplifying channel alternately operable at first and second different predetermined frequencies. The circuit comprises a first interstage transformer for translating output signals from the intermediate-frequency amplifying channel at the first predetermined frequency, the transformer having a tuned secondary winding resonant at the first predetermined frequency comprising first and second winding segments. The circuit further comprises a second interstage transformer for translating output signals from the intermediate-frequency amplifying channel at the second predetermined frequency, the transformer having a tuned secondary winding resonant at the second predetermined frequency. Means are provided for coupling the secondary winding of the second transformer between the secondary winding segments of the first interstage coupling transformer; and means are coupled across the tuned secondary winding of the first transformer for demodulating the first and second predetermined frequency output signals from the intermediate-frequency amplifying channel.

BRIEF DESCRIPTION OF THE DRAWING

The features of the present invention which are believed to be novel are set forth with particularity in the appended claims. The invention, together with further objects and advantages thereof, may best be understood by reference to the following description taken in conjunction with the accompanying drawing, in which the single FIGURE is a schematic representation, partially in block form, of a wave-signal receiver embodying the present invention.

DESCRIPTION OF THE PREFERRED EMBODIMENT

With the exception of certain circuitry in the last IF amplifier and detector stages, the illustrated receiver is essentially conventional in design and therefore only a brief description of its structure and operation need be given here. In accordance with standard practice, a common IF channel is utilized for signal processing in both AM and FM operating modes.

Considering standard FM broadcast operation first, a received FM signal is intercepted by an antenna 10 and coupled in a conventional manner to a radio-frequency (RF) amplifier 11, which may contain one or more frequency-selective stages. The output of RF amplifier 11 is applied to an FM converter stage 12, wherein it is translated to a predetermined intermediate frequency for subsequent amplification by an IF amplifier channel cpmprising first, second and third IF amplifier stages 13, 14 and 15, respectively. Although first IF amplifier 13 is adapted to handle two signals at widely separated frequencies, its design may be entirely conventional and therefore need not be shown in detail here.

IF amplifier stage 14 comprises a PNP transistor amplifier device 16 connected in conventional common-emitter configuration. The output signal from IF amplifier 13 is applied to the base of transistor 16 and its emitter is connected to ground by the parallel combination of a bias resistor 17 and a bypass capacitor 18. The collector of transistor 16 is connected to a source of unidirectional current by the series combination of an isolation resistor 19 and an amplitude limiting resistor 20. Conventional base biasing circuitry (not shown) in IF amplifier 13 supplies amplified AGC voltage to the base of transistor 16 for controlling the gain of stage 14 to compensate for amplitude variations in the received signal. The RF signal applied to the base of transistor 16 is amplified by that device and impressed by resistor 20 on the primary winding of an FM IF interstage coupling transformer 21, which is tuned to resonance at the FM IF frequency of 10.7 MHz by a shunt-connected capacitor 22. A tap on that winding is bypassed to ground at FM IF frequencies by series-connected capacitors 23 and 24 to provide a predetermined amount of signal loss in the output circuit of transistor 16 without which that stage would be unstable. The tap is also connected to a tap on the primary winding of an AM IF interstage coupling transformer 25, which is tuned to resonance at the AM IF frequency of 455 kHz by a shunt-connected capacitor 26. A capacitor 27 is connected between one end terminal of the primary winding of transformer 21 and the base electrode of transistor 16 to provide neutralization for that device. The secondary winding of interstage transformer 21 is tuned to the FM IF frequency by a shunt-connected capacitor 28. One end ternimal of this winding is bypassed to ground by a capacitor 29, and coupled by a resistor 30 back to the emitter of transistor 16.

The twice-amplified FM IF signal from amplifier stage 14 is once more amplified in an IF amplifier stage 15. This stage comprises an PNP transistor amplifying device 31 connected in common-emitter configuration, the FM IF signal from IF amplifier stage 14 being applied thereto by means of a direct connection from the base electrode of the transistor to a tap on the tuned secondary winding of transformer 21. Resistors 17 and 30 in stage 14 couple amplified AGC voltage from transistor 16 to the base of transistor 31, and a resistor 32 connected between the emitter of transistor 31 and ground provides operating bias to the emitter. A capacitor 33 bypasses the emitter to ground at FM IF signal frequencies. The collector of transistor 31 is connected by an amplitude limiting resistor 34 to one end terminal of the primary winding of an IF interstage coupling transformer 35, the other end terminal of which is connected to a source of unidirectional current by an isolation resistor 36. A capacitor 37 bypasses this latter element to ground at FM IF frequencies. The primary winding of transformer 35 is tuned to resonance at the FM IF frequency by a shunt-connected capacitor 38 so that the amplified FM IF signal from transistor 31 is developed therein.

During AM operation an intercepted signal is coupled by conventional means from an antenna 39 to an AM converter 40, wherein it is converted to an intermediate frequency, preferably much lower than that of the IF signal from FM converter 12. The AM IF signal from converter 40 is amplified by first IF amplifier 13 and applied to second IF amplifier 14 in much the same manner as the FM IF signal. During AM reception FM interstage transformer 21 is not resonant at the operating frequency of IF amplifier 14 and therefore presents only a negligible load impedance to transistor 16. The effective collector load now comprises tuned transformer 25, the primary winding thereof being resonated by capacitor 26 at the AM IF operating frequency. This winding, like the primary winding of FM interstage transformer 21, is tapped to introduce a predetermined amount of signal loss to stage 14 to assure stable operation.

During reception of NBFM public service broadcasts, the intercepted signal is received by antenna 10, amplified by RF amplifier 11 and converted to an intermediate frequency by converter 12. It is possible to use these stages for both the FM broadcast and public service bands by merely bandswitching their resonant circuits because of the close proximity of the two bands. The NBFM signal is converted to an intermediate frequency of 455 kHz to take advantage of the narrower bandwidth of the IF channel at this frequency, and is then amplified by IF amplifier stages 13 and 14 exactly as its AM counterpart, finally appearing on transformer 25.

Thus, during reception of FM broadcast signals the IF signal appears as a 10.7 MHz frequency modulated signal on transformer 35, during reception of AM broadcast signals as a 455 kHz amplitude modulated signal on transformer 25, and during reception of public service signals as a 455 kHz narrow-band frequency-modulated signal on transformer 25.

In accordance with the invention, the receiver is provided with a novel detector circuit capable of demodulating these three IF signals to produce an audio frequency output signal. To this end, the secondary winding of a first interstage coupling transformer, transformer 35, is constructed as a split winding, comprising a first section 41 and a second section 42. The inside end terminals of these two sections are connected by coupling means comprising a plurality of conductors to the end terminals of the secondary winding 43 of a second interstage coupling transformer, transformer 25. Winding segments 41 and 42 are tuned to resonance at a first predetermined frequency, the 10.7 MHz IF frequency, by a capacitor 44 connected across the outside terminals of the segments and winding 43 is tuned to resonance at a second predetermined frequency, the 455 kHz IF frequency, by a capacitor 45 connected across its end terminals. By virtue of the relatively large capacitance required to resonate winding 43 at the relatively low frequency of 455 kHz, the impedance presented by capacitor 45 between the center terminals of winding sections 41 and 42 at 10.7 MHz is very low, effectively electrically joining the coils at this frequency and enabling a single capacitor 44 to tune them to resonance without interaction from winding 43. Similarly, capacitor 44 has a relatively low capacitance because of the high resonant frequency of winding segments 41 and 42, so that at the 455 kHz operating frequency of winding 43 the shunt impedance presented by this element is relatively high and has little effect on the tuning of this winding.

Interstage transformer 35 is also provided with a first tertiary winding 46, which has one terminal connected to a center tap on secondary winding 43 and its remaining terminal connected to one terminal of a second tertiary winding 47 on interstage transformer 25. This comprises means for applying predetermined portions of the first and second predetermined frequency IF signals to the center tap. The other terminal of winding 47 is bypassed to ground at IF frequencies by a capacitor 48 and connected by an isolation and filter resistor 49 to the FM and NBFM terminals of a three-position mode switch 50. Another bypass capacitor 41 is connected between the switch side of resistor 49 and ground to provide additional attenuation for any residual IF signal.

The outside end terminals of winding sections 41 and 42 are connected to demodulating means in the form of a ratio detector circuit. Specifically, the outside terminal of winding 41 is connected to the cathode of a detector diode 52, the anode of which is connected to ground through a resistor 53 and the parallel combination of an IF bypass capacitor 54 and a diode load resistor 55. Similarly, the outside end terminal of winding 42 is connected to the anode of the detector diode 56, the cathode of which is connected to ground through a series resistor 57 and the parallel combination of an IF bypass capacitor 58 and a diode load resistor 59. The juncture of resistors 57 and 59 is connected to the arm of a three-position mode-switch 60, which is preferably ganged with switch 50. In the FM and NBFM positions of this switch the arm is connected to the positive terminal of an electrolytic filter capacitor 61, which provides amplitude limiting action in the ratio detector in a manner well known to the art. The other terminal of this capacitor is connected to the juncture of resistors 53 and 55. In the AM position switch 60 connects the juncture of resistors 57 and 59 to the AM terminal of mode switch 50 via a series filter resistor 62. The switch end of resistor 62 is connected to ground by a bypass capacitor 63, which serves to couple any residual IF signal at this point to ground. The arm of mode switch 50 is connected to one end terminal of a volume control potentiometer 64, the other end terminal of which is grounded. The arm of potentiometer 64 is coupled by a capacitor 65 to an audio amplifier 66, which may incorporate one or more stages of audio amplification for raising the signal from the detector to a level suitable for driving a loudspeaker 67.

Provision is also made in the detector for deriving an AGC control voltage suitable for application to IF amplifier 13 to vary the gain of that stage to compensate for variations in the amplitude of the received signal. Specifically, AGC voltage is derived at the juncture of resistors 53 and 55 and coupled by an isolation resistor 68 to the base electrode of a first AGC amplifier transistor 69. The emitter of this device is connected directly to the base of a second AGC amplifier transistor 70. The collector of transistor 70 is connected to the collector of transistor 69 and then to a source of unidirectional current by a common collector load resistor 71. The emitter of transistor 70 is grounded. The aforementioned connections establish transistors 69 and 70 in the well known Darlington configuration, a connection which provides high gain and high input impedance. The output of the transistor pair appears at the common collector connection, which is connected to ground by a voltage divider serially comprising resistors 72 and 73. The juncture of these resistors is connected to ground by a capacitor 74, which serves to both bypass the AGC line and establish a time constant for controlling AGC performance.

Thus, the detector circuit of the present invention provides for the development of an AGC voltage in each of its three operating modes by sampling the voltage at the juncture of resistors 53 and 55 by means of an isolation resistor 68, and amplifying the sample with a high gain amplifying stage such as the aforedescribed Darlington pair. During FM mode operation the voltage at this juncture is that produced across capacitor 61, and as is well known to the art this voltage is representative of the received signal level and is therefore well suited for producing the required AGC control effect. During AM operation the voltage produced at this juncture is a result of peak rectification by diode 52, and as such is also well suited for the AGC application.

The sample AGC voltage is applied to transistor 69, driving that device into heavier conduction with increased signal strength. Transistor 70, by virtue of the Darlington-pair configuration, is likewise driven into conduction, developing across the collector load resistor 71 an output signal which varies inversely with signal strength. This output signal is applied across resistors 71 and 73, which form a voltage divider for applying a predetermined portion of the amplified voltage to AM-FM IF amplifier stage 13. This voltage is amplified in that stage and applied by means of conventional interstage coupling circuitry to stages 14 and 15. Capacitor 74 is provided as a filter for eliminating unwanted transients on this AGC signal, and also for imparting a time constant to prevent unnecessary changes in the gain of the IF amplifier.

In operation, diodes 52 and 56 and their associated load circuits function essentially as a conventional ratio detector for frequency-modulated output signals from windings 41, 42 and 43. By virtue of the split secondary winding of transformer 35 and the connection of winding 43 therebetween, the 455 kHz NBFM signal is applied in push-pull relationship to diodes 52 and 56 in the same manner as the 10.7 MHz FM signal from transformer 35. In both cases the series-connected tertiary windings 46 and 47 associated with the transformers inject an in-phase sample of the IF signal into each diode, resulting in demodulation of the FM signal and production of oppositely-phased audio signals across resistors 55 and 59. Tertiary winding 47 is preferably self-resonant at 10.7 MHz, so that during 10.7 MHz IF operation this winding functions as a choke for the 10.7 MHz signal impressed on tertiary winding 46 and applied to the center tap of winding 43. As is well known to the art, the net voltage developed across resistors 55 and 59 remains substantially constant with modulation, varying only in response to changes in signal level. A capacitor 61 is connected across resistors 55 and 59 during FM operation to prevent such amplitude variations from effecting the audio output level. Resistors 53 and 57 serve as series load resistors for the diodes, preventing cut-off during sudden amplitude excursions in the applied signal, and capacitors 54 and 58 serve to bypass the detector output to ground at IF signal frequencies.

During FM operation audio is extracted from the detector by means of an impedance in series with the tertiary windings. Specifically, the body of potentiometer 64 is in series with the tertiary windings in FM operation, and it is across this resistance that the demodulated audio is developed. During AM operation mode switch 60 disconnects diode 56 from capacitor 61 and instead connects it through filter resistor 62 to the AM position of mode switch 50. An AM 455 kHz IF signal appears as an amplitude modulated signal on transformer 25, and as such is coupled in push-pull relationship to diodes 52 and 56. These diodes serve as conventional peak detectors for this signal, producing oppositely-phased audio signals across resistors 55 and 59, respectively. Since the body of potentiometer 64 also in the diode load circuit, a portion of the detected audio signal depending on the positioning of the potentiometer arm is applied to audio amplifier 66 for further amplification and application to speaker 67.

Thus, a detector has been shown and described which responds to frequency-modulated signals of different modulation indices on different IF frequencies, as well as to conventional amplitude-modulated signals. It does this with a minimum of mode switching, and with no switching whatsoever to RF circuitry within the intermediate-frequency channel. The same two detector diodes serve all three modes, in the FM modes functioning as a ratio detector and in the AM mode as peak detector and AGC detector, respectively. The net result is a circuit requiring fewer components and less space than prior art circuitry without any sacrifice in performance.

The following are a set of component values for the detector circuit of the invention which have been found to provide satisfactory operation. It will be appreciated that these values are given by way of example, and in no sense by way of limitation, and that other values may be substituted therefore without departing from the principles of the invention.

| | | | |
|---|---|---|---|
| C18 | 0.05 mfd | C38 | 40 mmfd |
| C22 | 40 mmfd | C44 | 40 mmfd |
| C23 | 470 mmfd | C45 | 390 mmfd |
| C24 | 0.05 mfd | C48 | 0.005 mfd |
| C26 | 150 mmfd | C51 | 0.05 mfd |
| C27 | 1.0 mmfd | C54 | 0.005 mfd |
| C28 | 40 mmfd | C58 | 0.005 mfd |
| C29 | 0.05 mfd | C61 | 10 mfd |
| C33 | 0.05 mfd | C63 | 0.05 mfd |
| C37 | 0.05 mfd | C65 | 10 mfd. |
| | | C74 | 5 mfd |
| R17 | 470 ohms | R55 | 4700 ohms |
| R19 | 470 ohms | R57 | 680 ohms |
| R20 | 120 ohms | R59 | 4700 ohms |
| R30 | 1000 ohms | R62 | 680 ohms |
| R32 | 270 ohms | R64 | 5000 ohms |
| R34 | 270 ohms | R68 | 270K ohms |
| R36 | 470 ohms | R71 | 470 ohms |
| R49 | 470 ohms | R72 | 68K ohms |
| R53 | 680 ohms | R73 | 15K ohms |
| D52 | 1N541 | D56 | 1N541 |
| TR16 | 2N2654 | TR69 | 2N2654 |
| TR31 | 2N2654 | TR70 | 2N2654 |

| | |
|---|---|
| T25 | Primary 240 T. No. 3/42 SPSNSW tapped at 63T<br>Secondary 180 T. No. 3/42 SPSNSW tapped at 90T<br>Tertiary 43T. No. 3/42 SPSNSW Carbonyl "E" 0.250 core |
| T35 | Primary 22T No. 36SP space wound 80T/in.<br>Secondary 13T each No. 32 DC bifilar wound<br>Tertiary 9T No. 36SP Carbonyl "E" 0.250 core |

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In a wave-signal receiver of the type having an intermediate-frequency amplifying channel alternately operable for translating a wide band FM signal at a first predetermined frequency and a narrow band FM signal at a second different predetermined frequency; a ratio detector circuit comprising:

a first interstage transformer coupled to said channel for translating output signals from said intermediate-frequency amplifying channel at said first predetermined frequency, said first interstage transformer having a pair of tuned secondary windings resonant at said first predetermined frequency and a first tertiary winding;

a second interstage transformer coupled to said channel for translating output signals from said intermediate-frequency amplifying channel at said second predetermined frequency, said second interstage transformer having a tuned secondary winding resonant at said second predetermined frequency and a second tertiary winding coupled to said first tertiary winding;

means for coupling said secondary winding of said second interstage transformer between said pair of secondary windings of said first interstage transformer; and means coupled across said pair of secondary windings of said first interstage transformer for demodulating said wide band and narrow band FM signals from said intermediate-frequency amplifying channel.

2. A detector circuit as described in claim 1, wherein said coupling means connects said secondary winding of said second interstage transformer in series with 3. A detector circuit as described in claim 2, wherein said pair of secondary windings of said first interstage transformer is tuned to resonance at said first predetermined frequency by means comprising a first capacitor coupled across the outside terminals of said pair of windings and said secondary winding of said second interstage transformer is tuned to resonance at said second predetermined frequency by means comprising a second capacitor coupled across its end terminals and wherein said first capacitor presents a substantial impedance at said second predetermined frequency and said second capacitor presents a negligible impedance at said first predetermined frequency.

4. A detector circuit as described in claim 1, wherein said first predetermined frequency is substantially 10.7 MHz and said second predetermined frequency is substantially 455 KHz to minimize interaction between said first and second interstage transformers.

5. A detection circuit as described in claim 1, wherein said tertiary windings are connected in series, one end of the series combination being connected to a point intermediate the ends of the secondary winding of said second interstage transformer and the other end of the series combination being connected to an audio frequency output terminal.

6. In a wave-signal receiver of the type having an intermediate-frequency amplifying channel alternately operable at first and second different predetermined frequencies, said first frequency being substantially higher than said second frequency, a detector circuit comprising:

a first interstage transformer coupled to said channel for translating output signals from said intermediate-frequency amplifying channel at said first predetermined frequency, said transformer having a pair of tuned secondary windings resonant at said first predetermined frequency and a first tertiary winding;

a second interstage transformer coupled to said channel for translating output signals from said intermediate-frequency amplifying channel at said second predetermined frequency, said transformer having a center-tapped tuned secondary winding resonant at said second predetermined frequency, and a second tertiary winding connected in series with said first tertiary winding;

means for coupling said secondary winding of said second interstage transformer in series with and between said pair of secondary windings of said first interstage transformer;

means connecting the free end of said first tertiary winding to said center-tap of said secondary winding, and the free end of said second tertiary winding to an audio frequency output terminal; and means comprising a ratio detector circuit having first and second detector diodes coupled across respective ones of the outside terminals of said pair of tuned secondary windings for demodulating frequency-modulated signals at said first and second predetermined frequencies from said intermediate-frequency amplifying channel and developing audio signals at said output terminal.

7. A detector circuit as described in claim 6, wherein said ratio detector has a filter capacitor coupled across a pair of diode load resistors, the voltage thereon being related to the amplitude of said frequency-modulated signals, and wherein AGC-amplifying means are further provided for applying said filter capacitor voltage to said amplifying channel to main-tain the level of said frequency-modulated signals constant.

8. A detector circuit as described in claim 7, wherein switch means are further provided for disconnecting said filter capacitor to enable one of said diodes to detect an amplitude modulated signal at one of said predetermined frequencies, and the other of said diodes to peak-rectify said signal to develop an AGC voltage for application to said AGC amplifying means.

9. A detection circuit as described in claim 4, wherein said ratio detector includes a pair of oppositely poled diodes and a filter capacitor coupled across said diodes; and switch means for disconnecting one terminal of said filter capacitor to enable detection of 455 KHz amplitude modulated signals by one of said diodes.

* * * * *

UNITED STATES PATENT OFFICE
CERTIFICATE OF CORRECTION

Patent No. 3,748,581 Dated July 24, 1973

Inventor(s) Joseph Yello

It is certified that error appears in the above-identified patent and that said Letters Patent are hereby corrected as shown below:

column 6, line 18, delete "71" and substitute --72--;

column 8, line 31, after "with" insert --said secondary windings of said first interstage transformer.--.

Signed and sealed this 18th day of December 1973.

(SEAL)
Attest:

EDWARD M.FLETCHER,JR.
Attesting Officer

RENE D. TEGTMEYER
Acting Commissioner of Patents